(12) United States Patent
Ishibashi

(10) Patent No.: US 7,506,367 B1
(45) Date of Patent: Mar. 17, 2009

(54) CONTENT MANAGEMENT METHOD, AND CONTENT STORAGE SYSTEM

(75) Inventor: Yoshihito Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/396,054

(22) Filed: Sep. 15, 1999

(30) Foreign Application Priority Data

Sep. 17, 1998 (JP) .................. 10-263694

(51) Int. Cl.
*G06F 13/00* (2006.01)

(52) U.S. Cl. .................. 726/10; 713/193; 380/203; 705/51; 705/57

(58) Field of Classification Search .................. 380/4, 380/23, 25, 30, 42; 713/164, 165, 183, 189, 713/193, 201, 159, 163; 340/5.28; 705/53, 705/64, 51–52
See application file for complete search history.

(56) References Cited

U.S. PATENT DOCUMENTS

| | | | | |
|---|---|---|---|---|
| 5,191,611 A * | 3/1993 | Lang | ............................ | 705/53 |
| 5,319,705 A * | 6/1994 | Halter et al. | .................... | 705/54 |
| 5,490,216 A * | 2/1996 | Richardson, III | ............. | 705/59 |
| 5,592,549 A * | 1/1997 | Nagel et al. | ..................... | 705/52 |
| 5,701,343 A * | 12/1997 | Takashima et al. | ............ | 705/51 |
| 5,768,389 A * | 6/1998 | Ishii | ............................. | 380/30 |
| 5,778,068 A * | 7/1998 | Johnson et al. | ............. | 713/189 |
| 5,784,464 A * | 7/1998 | Akiyama et al. | ............. | 713/155 |
| 5,805,699 A * | 9/1998 | Akiyama et al. | ............... | 705/58 |
| 6,002,772 A * | 12/1999 | Saito | | |
| 6,028,937 A * | 2/2000 | Tatebayashi et al. | ........ | 713/169 |
| 6,058,477 A * | 5/2000 | Kusakabe et al. | ............ | 713/169 |
| 6,085,323 A * | 7/2000 | Shimizu et al. | ............. | 713/201 |
| 6,118,874 A * | 9/2000 | Okamoto et al. | ............. | 380/282 |
| 6,185,685 B1 * | 2/2001 | Morgan et al. | ............... | 713/183 |
| 6,226,618 B1 * | 5/2001 | Downs et al. | .................. | 705/1 |
| 6,398,245 B1 * | 6/2002 | Gruse et al. | .................. | 280/228 |
| 6,421,779 B1 * | 7/2002 | Kuroda et al. | ............... | 713/169 |
| 6,477,649 B2 * | 11/2002 | Kambayashi et al. | ......... | 726/27 |
| 6,493,825 B1 * | 12/2002 | Blumenau et al. | ........... | 713/168 |
| 6,741,991 B2 * | 5/2004 | Saito | ............................. | 707/9 |
| 6,834,346 B1 * | 12/2004 | Ishibashi et al. | ............ | 713/179 |
| 6,912,512 B2 * | 6/2005 | Miyazaki et al. | .............. | 705/51 |

FOREIGN PATENT DOCUMENTS

| | | |
|---|---|---|
| JP | 01-276354 | 11/1989 |
| JP | 07-121987 | 5/1995 |
| JP | 07-244584 | 9/1995 |
| JP | 08-305662 | 11/1996 |
| JP | 08-335040 | 12/1996 |
| JP | 09-185501 | 7/1997 |
| JP | 10-083297 | 3/1998 |
| JP | 10-106148 | 4/1998 |
| JP | 10-215242 | 8/1998 |

* cited by examiner

*Primary Examiner*—Dov Popovici
*Assistant Examiner*—Neveen Abel Jalil
(74) *Attorney, Agent, or Firm*—Finnegan, Henderson, Farabow, Garrett & Dunner, L.L.P.

(57) ABSTRACT

A content management method and content storage system are provided in which a content key encrypted with a first storage key and stored along with a content encrypted with the content key in a first content storing means is decrypted with the first storage key, the content key obtained by the above decryption is encrypted with a newly generated second storage key and stored along with the encrypted content in a second content storing means. Thus, the content management method enables to safely duplicate (back up) a content while preventing the content from being copied fraudulently.

39 Claims, 11 Drawing Sheets

| KEY DATA 01ABCF54 | REPRODUCTION LIMITATION INFORMATION UNLIMITED | COPY LIMITATION INFORMATION UNLIMITED | OUTPUT INFORMATION ANALOG ONLY |
|---|---|---|---|

FIG.12A

| KEY DATA 86945ABC | REPRODUCTION LIMITATION INFORMATION 100 TIMES | COPY LIMITATION INFORMATION ANALOG ONLY | OUTPUT INFORMATION DIGITAL WITH SCMS |
|---|---|---|---|

FIG.12B

CONTENT MANAGEMENT METHOD, AND CONTENT STORAGE SYSTEM

BACKGROUND OF THE INVENTION

1. Field of the Invention

The present invention relates to a content management method and content storage system, in which a content is stored in a storage for management.

2. Description of the Related Art

These days, there have been proposed many ways of data service to users by serving an encrypted content over satellite broadcasting, cable communication, internet communication or similar network.

FIG. 1 shows flows of delivery of a content and its key from a content provider to a user's receiver, as a typical one of the conventional data services.

As shown in FIG. 1, a content provider 101 has non-encrypted contents such as music data, video data, games, document data including books, static image data, etc. When the content provider 101 provides a content to a service provider 102, it encrypts it with a content key it holds or generates. The content provider 101 supplies the content key to a key management center 103 as well. The content key may be different from one content to another or a common one for all contents the content provider 101 serves.

The key management center 103 encrypts the content key supplied from the content provider 101 with a delivery key the key management center 103 holds (it may be different from one user to another or a common one for all the users). Upon request from a user, the key management center 103 supplies the content key encrypted with the delivery key to the user.

The user has a receiver 104 adapted to receive a content key-encrypted content from the service provider 102 over the satellite, cable, internet or other communications network. To enjoy the supplied content, the user has to decrypt the content. To this end, the receiver 104 requests the key management center 103 to send a content key for decryption of the content supplied to the user. Upon request for sending of the content key, the key management center 103 will send the content key to the receiver 104. At this time, the key management center 103 will also account the served content. The accounting may be made in various manners. For example, an amount billed for the supplied content is paid from a user's bank account registered at the key management center 103. A request is made to the user for information of his or her credit card number and an accounting is made according to the credit card number. Alternatively, the receiver 104 may be provided with an IC card storing a prepaid amount of money from which an amount of money billed for the supplied content can be paid. When the accounting is completely performed, the user will have the right for the supplied content.

The user having received the encrypted content key will decrypt the content key with a delivery key held in an internal storage unit 111 of the receiver 104 and uses the decrypted content key to decrypt the encrypted content.

The user stores the decrypted content key in an external storage unit 112 by encrypting it with a unique storage key he holds, which is intended to prevent the delivery key having been used for delivery of the content key from being possibly be varied at every certain period. Also, if the content key is stored not encrypted, it is substantially the same as used in storage of the content as not encrypted, so that there is a likelihood that the data can freely be accessed by any other person. The above storage with the unique storage key is intended to avoid such an access by the other person. Further, so long as the user encrypts the content key with the unique storage key he holds, it is possible to avoid any possible re-accounting at the time of decrypting the same content. By encrypting the content key with the user's unique storage key, it is possible to prevent any third party from fraudulently copying the whole data stored in the external storage unit 112.

In some cases, however, the external storage unit 112 in which a content is stored becomes faulty and thus inaccessible. If the external storage unit 112 cannot thus be accessed, it is impossible to decrypt the content in the external storage unit 112. Also, since the right concerning the content has been purchased, the same content cannot be obtained without re-accounting. To avoid the above, the user has to copy the entire data in the external storage unit 112, which is a so-called "backup". Permission of such an unlimited backup will lead to an unlimited use of the content key.

For example, if a content key encrypted along with use-permission information including requirements for a frequency and time length for using the content key, can freely be backed up, there is a likelihood that the requirements will not be applied any longer and thus the content key will unlimitedly be used. By writing an unused data over a data for which the required frequency of use has been decreased as it has been used, the frequency requirement can possibly be restored to its initial status. It should be noted that the time-length requirement is a number of days, for example, for which a data can be used after it is supplied to the user from the service provider. The permission of unlimited backup will disadvantageously lead to unlimited use of a content key.

To prevent an unlimited use of a content key, it has been proposed as shown in FIG. 3 to store in each of the first external storage unit 112 and second external storage unit 113 non-rewritable ID information and use the ID information and a storage key together for encryption of the content key. In this method, the content and content key are backed up or duplicated from the first external storage unit 112 to the second external storage unit 113 by copying the entire data in the first external storage unit 112 as shown in FIG. 2.

A content key is decrypted using ID information as will be described below:

First, the content key is encrypted with a key extracted from ID information (the ID information itself may be used as a key), and further encrypted with a storage key. On the assumption that the content key is Kc, storage key is Ks, identification information of the first external storage unit is ID1 and identification information of the second external storage unit is ID2, the encryption can be expressed as follows:

$$K1=Enc(Kc, ID1)$$

$$K2=Enc(K1, Ks)$$

where "Enc(a, b)" indicates an encryption of the parenthesized data a with the data b taken as a key. That is, K2 thus obtained is an encrypted content key stored in the first external storage unit 112 and second external storage unit 113.

Then the receiver 104 decrypts the content key with data read from the first external storage unit 112 using the expression shown below:

$$K1=Dec(K2, Ks)$$

$$Kc=Dec(K1, ID1)$$

where "Dec(c, d)" indicates a decryption of the parenthesized data c with the data d taken as a key. Thus, the receiver 104 can correctly extract a content key Kc based on the data stored in the first external storage unit 112.

On the other hand, to decrypt the content key with data taken out of the second external storage unit 113, the decryption will proceed with the expression shown below:

$$K1=Dec(K2,Ks)$$

$$Kc=Dec(K1,ID2)$$

where "K1" to be decrypted with the identification information ID2 is Enc(Kc, ID1). Therefore, Kc cannot correctly be extracted because the ID information read from the second external storage unit 113 is ID2 and cannot be rewritten.

The above-mentioned encryption and decryption permit to prevent unlimited backup of a content key but no recovery can be made with the backup content key.

OBJECT AND SUMMARY OF THE INVENTION

It is therefore an object of the present invention to provide a content management method and content storage system, in which a content can be duplicated or backed up while being prevented from being copied.

The above object can be attained by providing a content management method and content storage system, for a data storage provided with a plurality of content storing means, in which a content key encrypted with a first storage key and stored along with a content encrypted with the content key in a first content storing means is decrypted with the first storage key, the content key obtained by the above decryption is encrypted with a newly generated second storage key and stored along with the encrypted content in a second content storing means.

In the above content management method and content storage system, the content key stored in the first content storing means is decrypted with the first storage key. In the content management method, the content key obtained by the above decryption is encrypted with the newly generated second storage key and stored in the second content storing means.

That is, the content key stored in the first content storing means is re-encrypted with the newly generated second storage key and stored in the second content storing means, thereby allowing the second content storing means to back up the content key stored in the first content storing means.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIG. 12 shows in detail a content key and use-permission information.

DETAILED DESCRIPTION OF THE INVENTION

First, the terminology used, and the processes referred to, in the illustration and description of the embodiments of the present invention will be described below.

"Content" includes all information which could be digital data and are valuable themselves. It includes, for example, music data, video data, games, document data such as books, static image data, etc.

The encryption algorithm may be any algorithm which would be able to encrypt data in such a manner that it will not be known to any third party. For example, a public key encryption and common key encryption are generally known as the encryption algorithm. The public key encryption is an algorithm in which a key used for encryption is different from a key used for decryption, and includes RSA encryption and elliptic curve encryption, for example. In the public key encryption, a key laid open to the public is called "public key" and a key kept confidential by the user is called "secret key". On the other hand, the common key encryption is an algorithm in which a key used for encryption is the same as a key used for decryption, and includes DES encryption, FEAL (of the Nippon Telegram and Telephone), Misty (of the Mitsubishi Electric), etc. for example. In the common key encryption, a key used is called "common key".

A mutual authentication between users A and B in which a public key encryption is used to ascertain that they are a right match to each other, will be described with reference to FIG. 4.

It should be noted that for the user A, the public key is Kpa, secret key is Ksa and identification key is IDa. Also note that for the user B, the public is Kpb, secret key is Ksb and identification key is IDb. Further it should be noted that for an authentication station C, the public key is Kpc and secret key is Ksc.

A certificate Ca for validation of the public key Kpa for the user A will be expressed as follows:

$$Ca=IDa+(\text{other information})+Kpa+Siga \quad (1)$$

where "Siga" can be expressed as follows:

$$Siga=Enc(\text{Hash}(IDa+(\text{other information})+Kpa),Ksc) \quad (2)$$

where "Hash( )" is a unidirectional function called "Hash function". The Hash function is to compress a long data to a data having a predetermined bit length, thereby making it difficult to know an input from an output. The Hash function includes MD5, SHA-1, etc. for example. The "+" means a connection between data. For example, "16-bit data+16-bit data" means that data are listed successively to produce a 32-bit data. The "Enco" indicates an encryption which is a public key encryption (RSA encryption, for example). A certificate Cb for validation of the public key Kpb for the user B is similar to the certificate Ca. Also note that the "Deco" indicates a decryption. That is to say, $$Cb=IDb+(\text{other information})+Kpb+Sigb.$$

Figure 1:
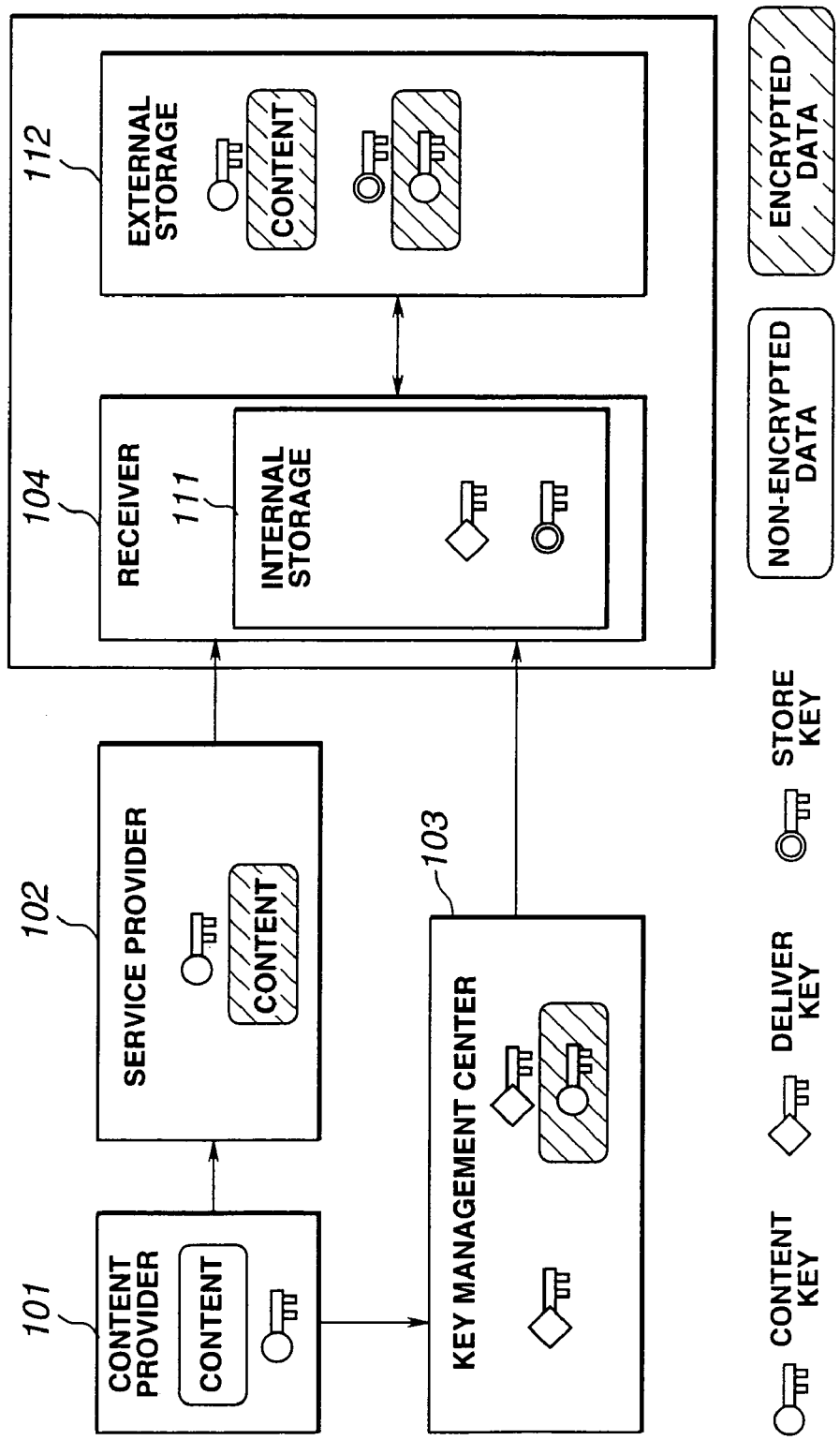
FIG. 1 is a block diagram of a conventional content service system.
Figure 2:
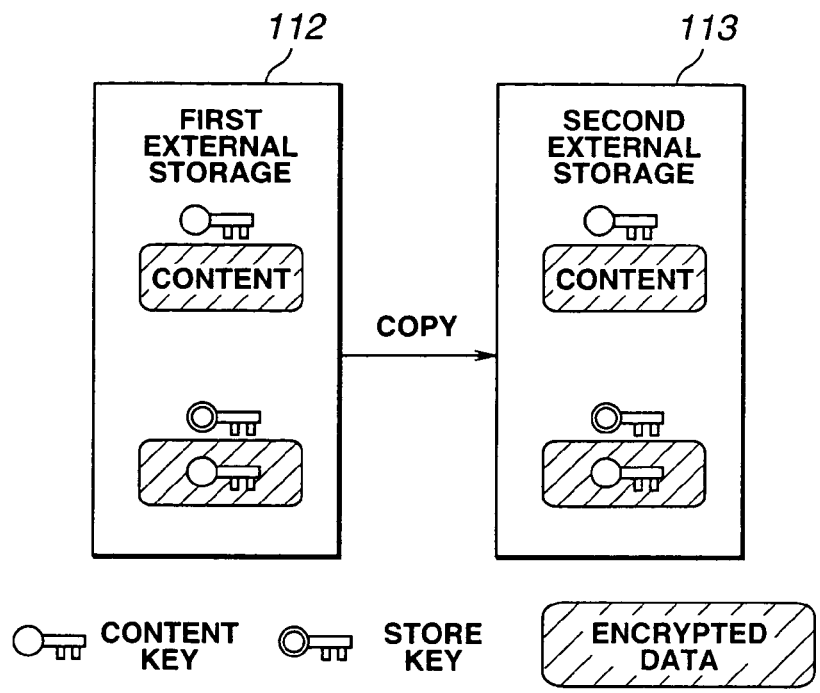
FIG. 2 explains how in a receiver in the conventional content service system in FIG. 1, a content key stored in a first external storage unit is backed up by a second storage unit.
Figure 3:
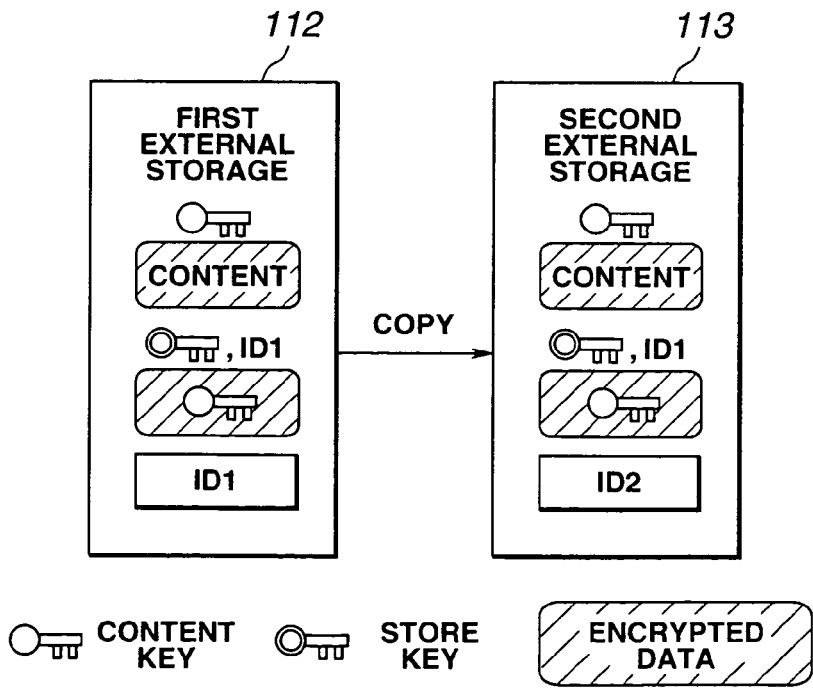
FIG. 3 explains how in the receiver in the conventional content service system in FIG. 1, the content key stored in the first external storage unit is backed up by the second storage unit through encryption and decryption of the content key with its own identification information.
Figure 4:
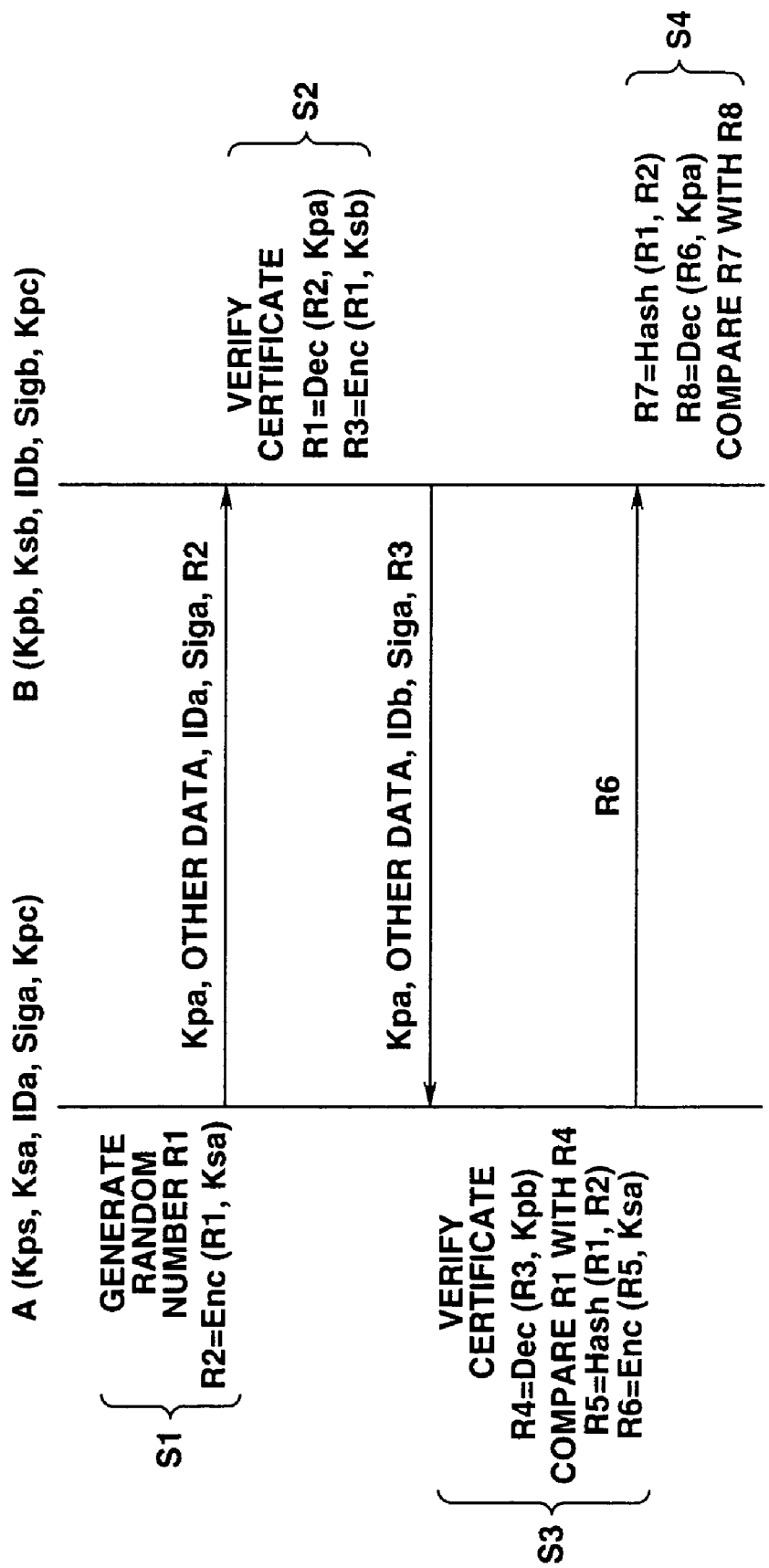
FIG. 4 is a block diagram of an embodiment of content service system according to the present invention.

The mutual authentication is effected following the procedure including the steps S1 to S4 as in FIG. 4. Note that the users A and B hold, in addition to their own key and ID information, the certificates Ca and Cb for their public keys and the public key Kpc for the authentication station C, respectively.

First at Step S1, the user A generates a random number R1. A relation (3) shown below is used to encrypt he random number R1 with Ksa to generate a random number R2. Then, Ca and R2 are sent to the user B.

$$R2=Enc(R1,Ksa) \qquad (3)$$

Next at step S2, the user B verifies if the certificate Ca (=IDa+(other information)+Kpa+Siga) sent from the user A is valid. To this end, the user B will first generate D1=Hash (IDa+(other information)+Kpa), and then compare D1 with Dec(Siga, Kpc). If the user B detects a match between them, it judges that Kpa is valid.

When the user B judges that Kpa is valid, R2 is decrypted with Kpa to generate R1 as given below:

$$R1=Dec(R2,Kpa) \qquad (4)$$

Next, R1 is encrypted with Ksb to generate R3 as in a relation (5) shown below. Then, Cb and R3 are sent to the user A.

$$R3=Enc(R1,Ksb) \qquad (5)$$

Then at step S3, the user A verifies, as at step S2, if the certificate Cb sent from the user B is valid, in order to judge if Kpb is valid. When the user A judges that Kpb is valid, R3 is decrypted with Kbp to generate R4 as given below, and comparison is made between R4 and R1.

$$R4=Dec(R3,Kpa) \qquad (6)$$

If there is a match between R1 and R4, it means that Ksb is held by the user B. That is, it is possible to judge that the user B is valid. On the contrary, if no match is found between R1 and R4, it means that the user B has fraudulently accessed the certificate Cb.

Next, the Hash function is used to generate R5 from R1 and R2 as given below:

$$R5=Hash(R1,R2) \qquad (7)$$

Then, R5 is encrypted with Ksa to generate R6 as given below. R6 is sent to the user B.

$$R6=Enc(R5,Ksa) \qquad (8)$$

Next at step S4, the user B uses the Hash function to generate R7 from R1 and R2 as given below:

$$R7=Hash(R1,R2) \qquad (9)$$

Then, R6 sent from the user A is decrypted with Kpa to generate R8 as given below:

$$R8=Dec(R6,Kpa) \qquad (10)$$

Then, comparison is made between R7 and R8. Match between them proves that the user A has Ksa. If no match is found between them, it means that the user A has fraudulently accessed the certificate Ca.

As in the foregoing, the users A and B can mutually authenticate that they are a valid match to each other. It should be noted that data such as the random number R1, etc. are used as a provisional key which will be called "session key".

As an internal storage unit, any recording medium like a memory (flash memory, EEPROM, etc.) in a tamping-resistant single-chip IC incorporated in a receiver, an IC card capable of data communications with the receiver, or the like may be used which would disable any third party from easy access to the data stored in them.

A recording medium or storage unit like a hard disc, optical disc, tape medium, semiconductor memory or the like may be used as external storage units. These external storage units may have written therein identification information (ID) by which they can be identified, respectively. The ID information should preferably be non-rewritable.

Data for backup of an encrypted content may be supplied from a third party or duplicated freely since the encrypted content itself cannot be accessed unless a content key is available.

An encrypted content key stored in the external storage unit includes in data of the key thereof use-permission information, fee, frequency for the use of the content key in addition to a decryption key for decryption of the content, and ID information for a receiver from which the content (or content key) has been purchased. The frequency referred to herein means information of a limited frequency for using a content key. For example, it is a number of times by which a content key can be decrypted and which is decreased by one each time the content key is decrypted.

The decryption of a content key is to decrypt a content key encrypted as having been described in the above to extract requirements for decryption of the content key. Namely, a content encrypted according to requirements for use of the content is decrypted. If a frequency for decryption of a content key is limited to 10 times, for example, it is decreased by one each time the content key is decrypted, that is, the frequency becomes 9 times when the decryption is made once. Also, if the requirements include an inhibition of copying, copying of a content to any other equipment is limited against decryption of the content.

Next, an embodiment of data service system according to the present invention will be described with reference to a block diagram thereof in FIG. 5.

Figure 5:
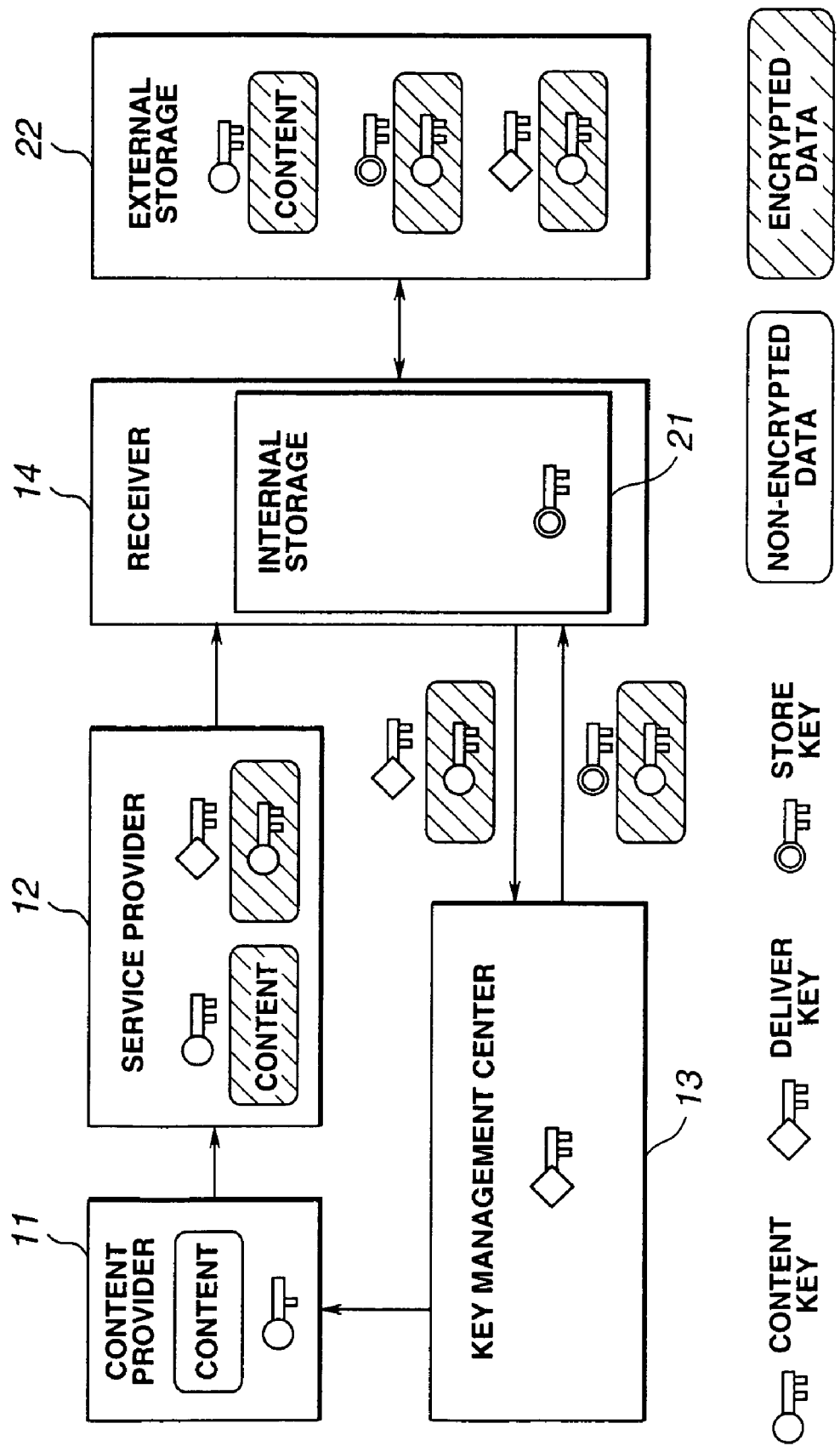
FIG. 5 is a block diagram of another embodiment of content service system according to the present invention.

According to the present invention, the first embodiment of the data service system comprises, as shown in FIG. 5, a content provider 11 holding a non-encrypted content, a service provider 12 which serves the content held by the content provider 11 to users or subscribers over the satellite, cable, internet or similar communication network, a key management center 13 which manages content keys and accounts a content served to a user, and a receiver 14 which provides the content in the form of a sound or image. The receiver 14 has an internal storage unit 21 and also has an external storage unit 22 connected thereto.

How the content provided from the content provider 11 is sent to and stored into the external storage unit 22 of the receiver 14 of a user will be described herebelow with reference to FIG. 5.

The content provider 11 holding the non-encrypted content generates a content key (common key, for example) by a random number generator (not shown) ad encrypts the content with the content key. The content provider 11 is supplied with a delivery key (may be a common key or public key, for example) from the key management center 13, and using the supplied content key, it encrypts the content key and other information such as use-permission information and so forth. The content provider 11 supplies these encrypted content and content key to the service provider 12.

The receiver 14 owned by the user receives the encrypted content and content key sent from the service provider 12 over the satellite, cable, internet or similar communication network. The user having received the encrypted content and content key has to decrypt them for enjoying the content. To this end, the user acquires the decrypted content key as will be described below.

The receiver 14 sends the decrypted content key directly to the key management center 13. At this time, the encrypted content key may be stored in the external storage unit 22 once or not. That is, since the user has the delivery key used for encryption of the content key and cannot decrypt the content key, it sends the content key along with its own identification information and storage key to the key management center 13 once. The key management center 13 having received the content key, identification information and storage key decrypts the content key with its own delivery key and re-encrypts the content key with the storage key received from the user. Thereafter, the key management center 13 will account the served content based on the user's ID information and returns to the user the content key encrypted with the storage key.

These data may be sent as they are or after encrypted with a session key established by a mutual authentication. To encrypt the content key, etc, with the session key, the user may send no storage key to the key management center 13. In this case, after receiving the content key encrypted with the session key, etc., the user uses the session key to decrypt he content key, etc. once and then encrypts the content key with its own storage key.

Having received the content key, the receiver 14 stores into the external storage unit 22 the content key encrypted with the storage key. Since the storage key is stored in the internal storage unit 21, the content key can always be decrypted and the content key can be used to decrypt the content. It should be noted that although only one key is shown in each of the external and internal storage units 22 and 21 in FIG. 5, the content and content key may be stored in a larger number in each of the storage units in practice.

As in the foregoing, the content service system according to the present invention, a content held by the content provider 11 can be encrypted with a content key for service to the user and the content key used to encrypt the content can be encrypted with for supply to the user. Thus the user can decrypt the supplied content key to decrypt the content.

The key management center 13 may account a content service in any of the following three manners:

(1) A user's back account number or credit card number related to user identification information are held, and a money amount billed for the served content is paid from the bank or credit company based on the account or credit card number.

(2) Each time, request is made to the user for sending his bank account number and credit card number together each time a key is send to the user, and an mount billed for the content service is paid from the bank account or credit company.

(3) An amount billed for the content service is paid from an electronic money cumulated in the internal storage unit 21 of the receiver 14.

Figure 6:
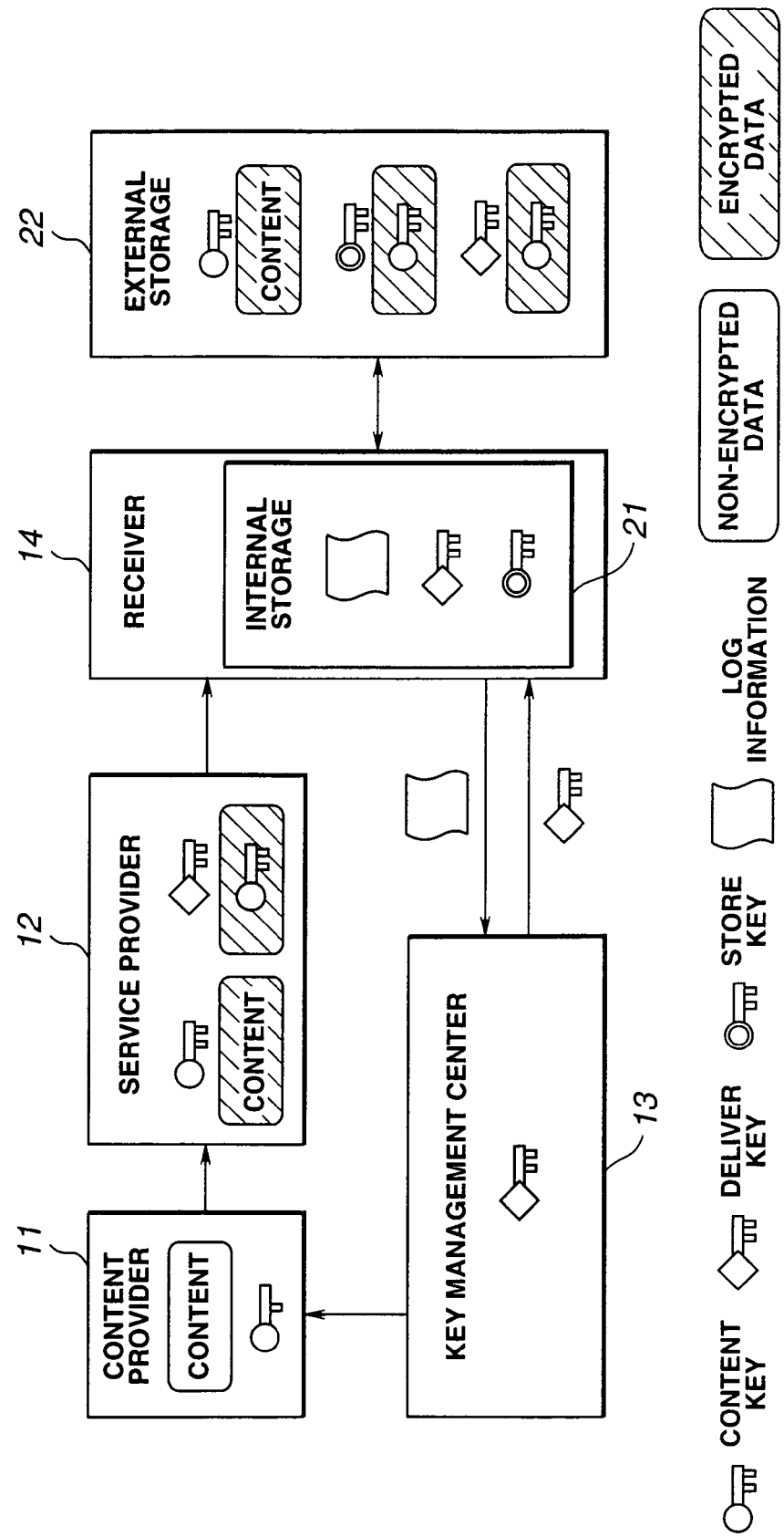
FIG. 6 is a block diagram of a still another embodiment of content service system according to the present invention.

Also in the data service system, a delivery key may be held in the internal storage unit 21 of the receiver 14 in advance as shown in FIG. 6, and used to decrypt the content key. In this case, the user uses his own storage key to re-encrypt the content key decrypted with the delivery key, for storage into the external storage unit 22. Further, log information is prepared each time the content key is decrypted, and cumulated into the internal storage unit 21. In a predetermined time, when the delivery key has been decrypted a predetermined number of times or when the delivery key has been updated, the log information is sent to the key management center 13 for accounting the content service having so far been done.

It should be noted that when it is intended to pre-store the delivery key in the internal storage unit 21 as in the above, the delivery key used by the service provider 12 is updated at every predetermined period (one month, for example) and the user is supplied with the delivery key from the key management center 13. Namely, the delivery key is varied from time to time for the purpose of safety since it is common to all the users.

Figure 7:
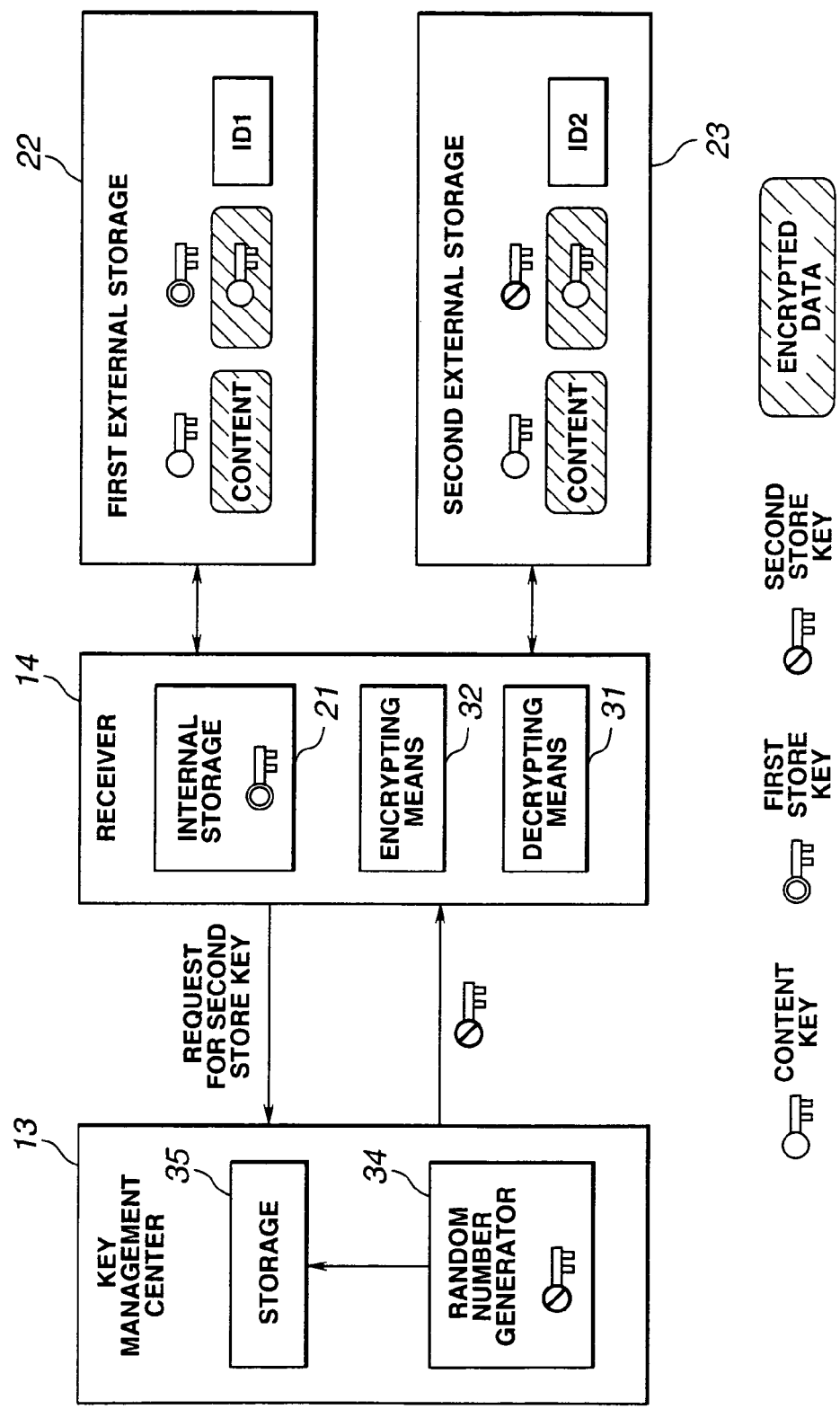
FIG. 7 is a block diagram of the content service system in which a receiver has a second external storage unit.

As shown in FIG. 7, the receiver 14 comprises a second external storage unit 23. Here, how the content key stored in the external storage unit 22 (will be referred to as "first external storage unit" hereinafter) is duplicated or backed up into the second external storage unit 23, will be described herebelow.

In the data service system, the receiver 14 incorporates means 31 for decryption of data and key data, means 32 for encrypting data and key data and the internal storage unit 21 in which the storage key is stored. The receiver 14 further comprises the first external storage unit 22 to store a content, and the second external storage unit 23 to store a content. The receiver 14 is composed of a tamping-resistant IC chip, for example. The internal storage unit 21 is implemented using a flash memory inside the IC chip, while the decrypting means 31 and decrypting means 32 are implemented using ASIC and program.

The first external storage unit 22 stores a content key encrypted with a first storage key, and a content encrypted with the content key. The second external storage unit 23 stores an encrypted content key obtained by encrypting, in the encrypting means 32, the content key decrypted with the first storage key in the decrypting means 31, with a second storage key generated by the random number generator 34.

Thus, the first and second external storage units 22 and 23 store their respective identification information ID1 and ID2 as non-rewritable data.

The first external storage unit 22 is formed from a hard disk having an IEEE 1394 interface, for example. The second external storage unit 23 is formed from an optical disk drive having an IEEE 1394 interface, and an optical recording medium. In case the first and second external storage units 22 and 23 are a hard disc, for example, the identification information should be written in ROM to be read when a special command is given. In case the storage units 22 and 23 are an optical disc or the like, the identification information should be stored along a non-rewritable track.

In the data service system, the key management center 13 comprises a random number generator 34 to generate a storage key, and a storage unit 35 to store the storage key generated by the random number generator 34 and identification information of the external storage unit which store a content encrypted with the storage key. The storage unit 35 has stored therein various keys including a management key, the second storage key generated by the key management center 13, etc. for example.

Next, the data service system constructed as having been described functions as will be described below following the procedure in which the content key stored in the first external storage unit 22 of the receiver 14 is backed up.

When going to back up a content key the user has purchased, the user will first send a storage key request command to the key management center 13 have the key management center 13 send a second storage key to the user. The storage key request command includes the identification information of the receiver 14, identification information ID2 for the second external storage unit which stores a backup data, etc.

Receiving the storage key request command, the key management center 13 generates a second storage key by means of the random number generator 34. The key management center 13 will store the second storage key and the supplied identification information ID2 for the second external storage unit 23 into the storage unit 35 while returning the second storage key to the receiver 14. At this time, the key management center 13 may account the content service based on the identification information of the user's receiver 14. Note that this accounting is rather a registration of the user than its literal meaning. Namely, the key management center 13 may register the user as having accessed the data service. The key management center 13 may be connected to the receiver 14 by an internet, cable or telephone communications network.

Figure 8:
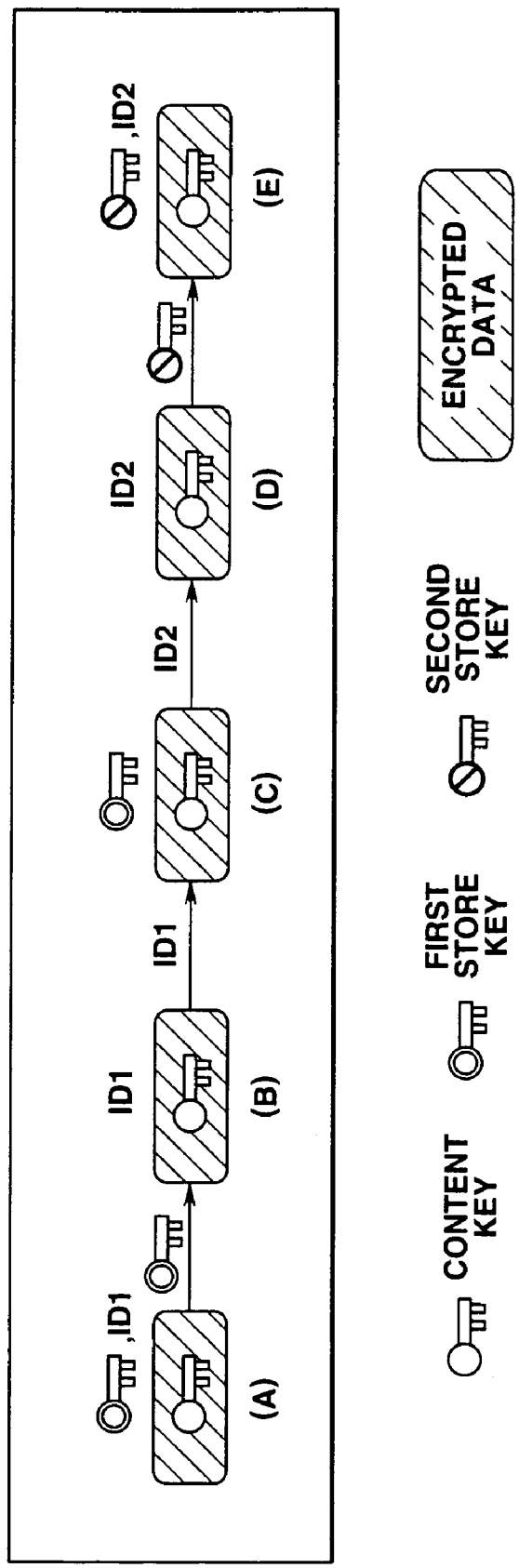
FIG. 8 explains how the receiver makes a request to a key management center for sending of a second storage key and the second storage key received by the receiver is stored into the second external storage unit.

The receiver 14 will use the second storage key sent from the key management center 13 to back up the content key stored in the first storage unit 22. FIG. 8 shows in detail the flows of a procedure of processing the content key stored in the first external storage unit 22 during backup of a content.

Receiving the second storage key, the receiver 14 reads the content key from the first storage unit 22 for decryption thereof. The procedure of this content key decryption comprises the steps of decrypting the content key with the first storage key stored in the internal storage unit 21 (in the steps (A) to (B) in FIG. 8), and re-decrypting the decrypted content key with the identification information ID1 of the first external storage unit 22 (in the steps (B) to (C) in FIG. 8).

Further, the receiver 14 encrypts the content key obtained by the above decryption and stores it into the second external storage unit 23. The procedure of this content key encryption and storage into the second external storage unit 23 comprises the steps of encrypting the content key with the identification information ID2 of the second external storage unit 23 (in the steps (C) to (D) in FIG. 8) and re-encrypting the encrypted content key with the second storage key having previously been received from the key management center 13 for storage into the second external storage unit 23 (in the steps (D) to (E) in FIG. 8).

Note that this encryption of the content key for storage into each external storage unit is effected using the identification information of the external storage unit into which the storage key and content key are stored. The encryption with the identification information will not be described and shown any longer in the following description and illustration of the present invention.

In this way, the content key stored in the first external storage unit 22 is backed up or duplicated into the second external storage unit 23. Thus it is possible to prevent any third part from fraudulently duplicating or copying the content key and safely back up the content key in the first external storage unit. The key management center 13 can make an accounting to the user of the receiver 14 for the data service based on the request of content key backup, namely, based on the request for generation of the second storage key.

The backup procedure having been explained above is a basic one. The backup procedure will be described in further detail hereinbelow.

Figure 9:
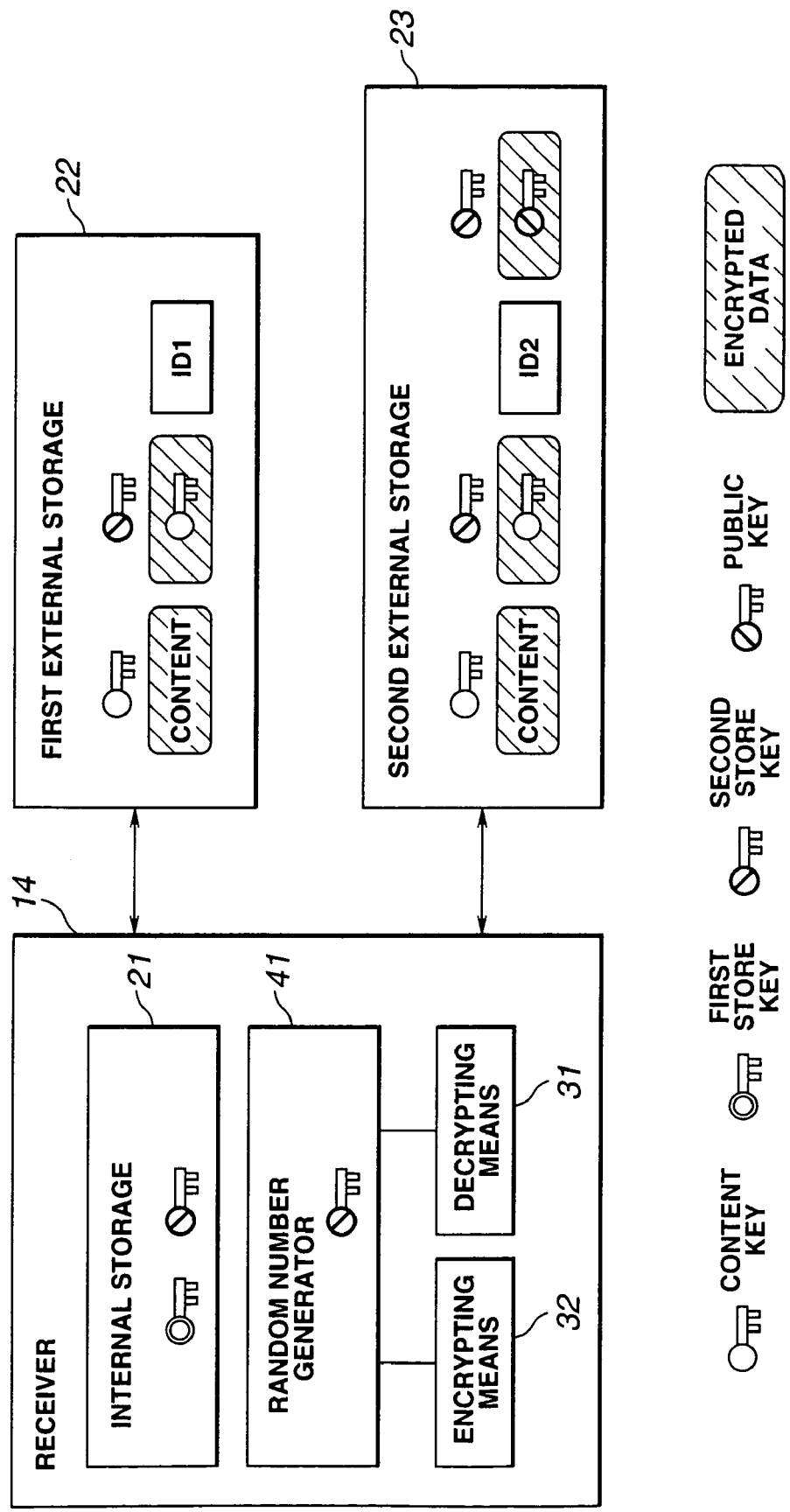
FIG. 9 is a block diagram of the content service system in which the receiver has a random number generator which generates the second storage key.

A third storage key may be generated based on the second storage key to back up the content. For generation of the second storage key, the second storage key is received from the key management center 13 in the aforementioned embodiment. As shown in FIG. 9, however, a random number generator 41 may be provided in the receiver 14 to generate a second storage key. In this case, the receiver 14 uses the public key of the key management center 13 existing in the internal storage unit 21 to encrypt the second storage key thus generated, to thereby provide a third storage key. The third storage key is stored into the second external storage unit 23.

Figure 10:
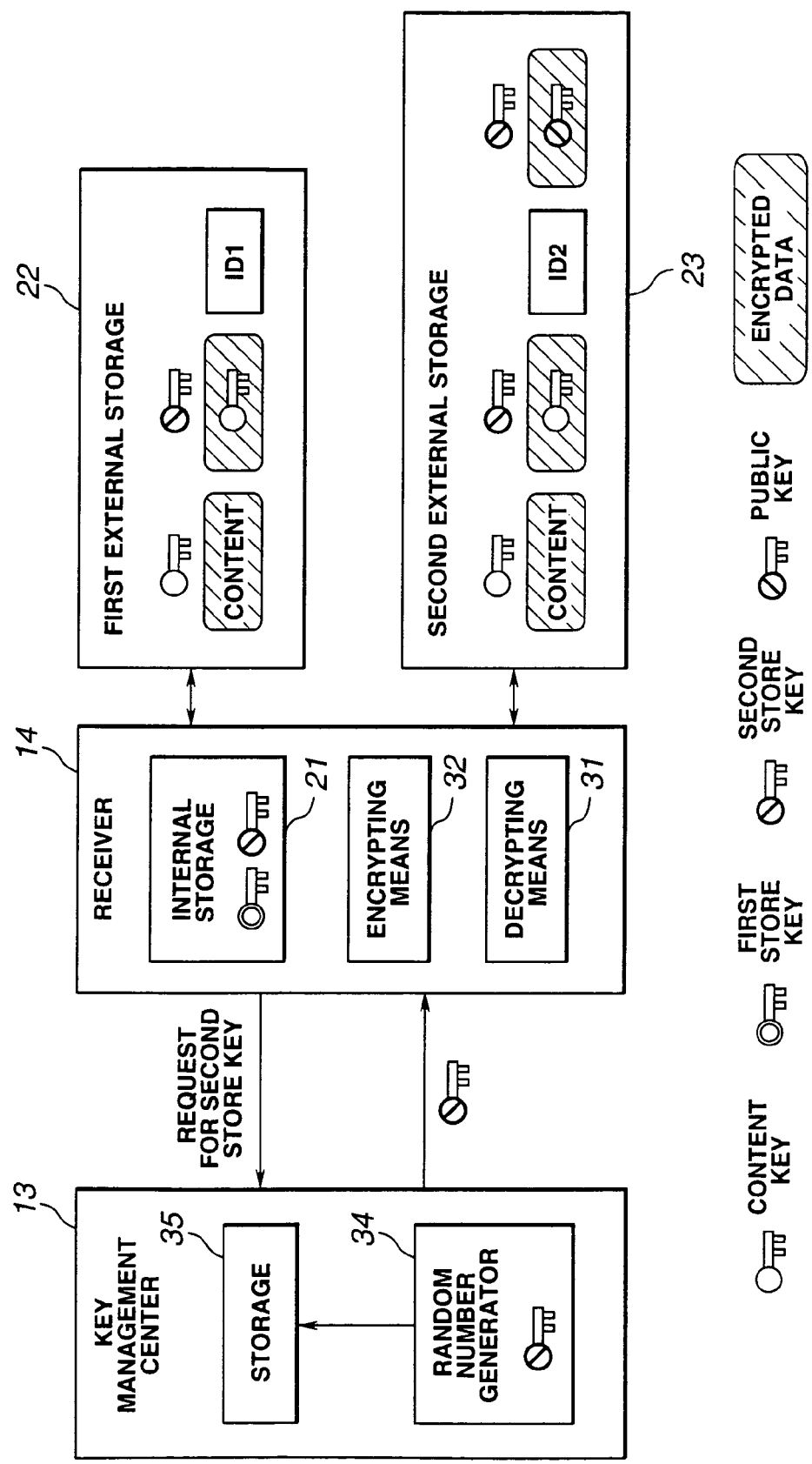
FIG. 10 is a block diagram of the content service system in which the receiver generates a third storage key by encrypting the second storage key with an public key of the key management center.

As also shown in FIG. 10, the receiver 14 can use the public key to generate a third storage key based on the second storage key which is supplied from the key management center 13 based on a request made from the receiver 14 to the key management center 13 for sending of the second storage key to the user.

Thus, the content key can freely be backed up by encrypting the second storage key using the public key of the key management center 13. To decrypt the backup content key, however, the secret key of the key management center 13 is required. Therefore, the key management center 13 can utilize this fact to account the content service when an access is made to the third storage key for decryption of the backup content key.

Also, a third storage key can be generated in the key management center 13. In this case, the key management center 13 generates a second storage key by means of the random number generator 34 while generating a third storage key by encrypting the second storage key with the management key held in the storage unit 35. The key management center 13 sends the third storage key along with the second storage key to the receiver 14 in which the third storage key is stored into the second external storage unit 23.

To generate the third storage key in the receiver 14, the public key of the key management center 13 is used. To generate the third storage key in the key management center 13, however, either the public key or the common key may be used as the management key to prevent any unprincipled third party from making a fraudulent access to the third storage key. If the common key is used in the receiver 14 to generate the third storage key, that key will be kept as it is in the internal storage unit 21 so that such an unprincipled third party can easily access the third storage key. On the other hand, the key stored in the key management center 13 is difficult to access by any third party, so any of the public or common key can be used to generate the third storage key in the key management center 13. That is to say, the receiver 14 is owned by the user and the key management center 13 is owned by a system management company, as a rule. If the content key is left or kept at the user's receiver 14, it will be easy to access from any third party and the receiver 14 itself is easily disassembled for fraudulent access to the content key. However, the content key at the key management center 13 is difficult to access.

Allowing the key management center 13 to generate the third storage key for storage in the second external storage unit 23 makes it impossible for any third party to freely back up the data. Further, since the key management center 13 has not to manage the second storage keys of all the users, it is less loaded.

Once the third storage key is generated as in the above, the second storage key may be deleted. Namely, after the third storage key is received from the key management center 13 or after the third storage key is generated in the receiver 14, it is ascertained that a backup data has been created and then the second storage key is deleted.

By deleting the used second storage key, the backup data cannot be restored unless the key management center 13 has finished a due accounting for the data service. For example, when it is necessary to restore the content key, the receiver 14 makes a request to the key management center 13 for sending the second storage key. The content key is restored when a content key put aside as a backup content key is required for any reason. For instance, when the first external storage unit 22 has failed and is inoperable, the restoration of content key will be done.

More specifically, the receiver 14 will request the key management center 13 for sending thereto the second storage key based on the identification information of the second external storage unit 23. That is to say, the receiver 14 reads the identification information ID2 from the second external storage unit 23 and sends it along with the identification information of the receiver 14 to the key management center 13. Upon reception of the identification information, the key management center 13 will search the second storage key from the internal storage unit 35 based 3 on the identification information of the second external storage unit 23 and return it to the receiver 14. Thus, the second storage key is sent to the receiver 14 while the key management center 13 accounts for the data service in a predetermined manner based on the identification information of the receiver 14. The accounting is effected as having previously been described.

If the second storage key has been deleted after the third storage key is generated, the receiver 14 will be able to acquire a second storage key based on the third storage key, which has previously been described with reference to FIG. 11.

Figure 11:
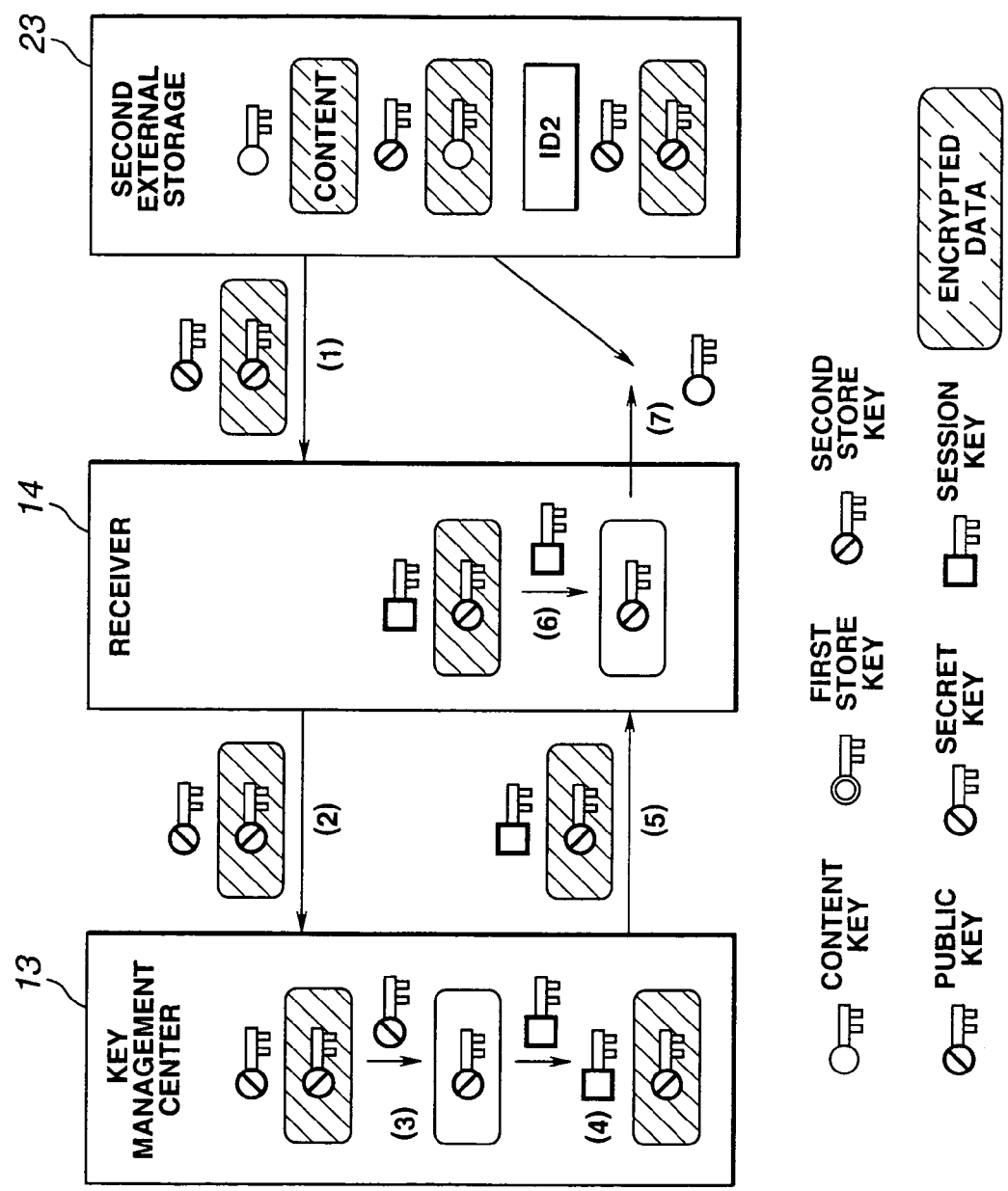
FIG. 11 explains how the receiver sends to the key management center the third storage key generated by encrypting the second storage key with the public key of the key management center and is thus supplied with the second storage key from the key management center.

The receiver 14 sends the third storage key to the key management center 13 (in the steps (1) and (2) in FIG. 11). Note that the third storage key has been generated by encrypting the second storage key with either the public key or the management key of the key management center 13 (the same as the public key of the key management center 13) as previously mentioned. Also, the receiver 14 may send the third storage key along with the identification information of the receiver 14 and second external storage unit 23, respectively, to the key management center 13.

Receiving the third storage key, the key management center 13 decrypts it with the secret key held in the storage unit 35 to generate a second storage key (in the step (3) in FIG. 11), and then encrypts the second storage key with the session key (in the step (4) in FIG. 11). Note here that the session key has been established for example during a mutual authentication effected before data transfer between the key management center 13 and receiver 14.

The key management center 13 returns the data (the second storage key encrypted with the session key) to the receiver 14. The key management center 13 makes accounting in the predetermined manner at the time of returning the second storage key to the receiver 14.

The receiver 14 owns the same session key as that held by the key management center 13. The session key is stored in the internal storage unit 21 for example. In the receiver 14, the session key is used to decrypt the data sent from the key management center 13 to generate a second storage key (in the step (6) in FIG. 11). The second storage key is used to decrypt the content key (in the step (7) in FIG. 11).

As in the above, the third storage key encrypted with the public key of the key management center 13 is sent to the key management center 13. In the key management center 13, the third storage key is used to generate the second storage key. Thus, the load to the key management center 13 is lessened and the content key can be restored.

Further, the receiver 14 can store also the identification information thereof in the second external storage unit 23 when backing up into the second external storage unit 23 the content and content key stored in the first external storage unit 22. Thereby, it is made possible to restore the content key only at an authenticated receiver or user.

In this case, during the restoration of content key, the receiver 14 reads receiver identification information sent from the second storage unit 23 and checks the receiver identification information. Based on the checking result, it is verified whether the received receiver identification information is identical to the receiver for which the content key is under restoration. When the receiver identification information is not identical to the identification information of the receiver from which the content key is being restored, the restoration can be aborted.

Also, the receiver 14 can add, to the use-permission information of the restored content key, information that the content key is a restored one. Thus, when the restored content key is to be moved to the first external storage unit 22, the receiver 14 can make a comparison between the content key and a one stored in the destination storage unit, namely, the first external storage unit 22, if the using requirements for the read content key have added therein information that the content key is a restored one. If based on the comparison result, the restored content key is proved identical to the content key stored in the destination, an error processing can be made to inhibit any third part from restoring the content key through an appropriate backup for storage of a plurality of content keys in the same storage unit.

Furthermore, frequency information defining the number of times the content key can be used can be added to the content key to prevent the number of times for the content key having been decreased as the content key is used from being rendered to its initial value through the content key restoration. Namely, the receiver 14 may be adapted not to back up a content key for which the number of times has been decreased.

The receiver 14 may be adapted to store the identification information ID1 of the first external storage unit 22 along with the content key backed up in the second external storage unit 23, whereby it can be prevented from duplicating a content key by re-connecting the first external storage unit 22 which should have failed. This can be implemented as will be discussed below.

First the receiver 14 stores the identification information ID1 of the first external storage unit 22 along with the backup content key into the second external storage unit 23. Then, curing the restoration of the content key, the receiver 14 moves and stores the identification information ID1 of the first external storage unit 22, stored in the second external storage unit 23, into the internal storage unit 21 of the receiver 14. Further, when it is requested to restore the content key in the first external storage unit 22, the receiver 14 compares the identification information of the first external storage unit 22 for which it is requested to restore the content key, with an identification signal of an external storage unit in which the content key has been backed up, that has been obtained from the second external storage unit 23 in which the content key restoration has already been made, and which is currently held in the receiver 14. Based on the comparison result, an error processing is effected.

The receiver 14 is adapted not to access any external storage unit in which a restored content key is stored by verifying the identification number stored in the internal storage unit 21, so that it can duplicate no content key by re-connecting the first external storage unit 22 which should have failed.

FIG. 12 shows examples of content key and use-permission information. In a first example, a key data with a content key "01ABCF54" has added thereto "unlimited" as reproduction limitation information indicating a limited number of times the content key can be used, "unlimited" as copy limitation information, and "analog only" as output information as shown in FIG. 12A. In a second example, a key data with a content key "86945ABC" has added thereto "100 times" as reproduction limitation information indicating a limited number of times the content key can be used, "analog only" as copy limitation information, and "digital with SCMS" as output information as shown in FIG. 12B.

The backup of the content key stored in the first external storage unit into the second external storage unit has been described in the foregoing. Note that the external storage units may be any one which would be able to store data, such as a magnetic recording medium like a floppy diskette, optical recording medium like CD-R, or the like. Also, it may be an IC card having a writable memory.

The content management method according to the present invention is such that a content key encrypted with a first storage key and stored along with a content encrypted with the content key in a first content storing means is decrypted with the first storage key, the content key obtained by the above decryption is encrypted with a newly generated second storage key and stored along with the encrypted content in a second content storing means.

That is, the content key stored in the first content storing means is re-encrypted with the newly generated second storage key and stored in the second content storing means, thereby allowing the second content storing means to back up the content key stored in the first content storing means.

The content management method enables to safely duplicate (back up) a content while preventing the content from being copied fraudulently.

What is claimed is:

1. A content management method for managing content data provided to user equipment, comprising the steps of:
    storing a content key encrypted with a first storage key, content data encrypted with the content key, and a second storage key in the user equipment, wherein the second storage key, is encrypted with a public key for a key management unit for management of the storage keys to generate a third storage key and the third storage key is stored in the user equipment;
    sending the encrypted content key and the second storage key to the key management unit;
    at the key management unit, decrypting the encrypted content key using the first storage key, the first storage key being stored in the key management unit;
    encrypting the decrypted content key using the second storage key;
    sending the content key encrypted with the second storage key to the user equipment; and
    at the user equipment, decrypting the encrypted content key using the second storage key and decrypting the content data using the decrypted content key.

2. The method as set forth in claim 1, wherein the second storage key is generated based on a random number.

3. The method as set forth in claim 1, wherein the decrypted content key is encrypted with identification information of the user equipment and stored into the user equipment.

4. The method as set forth in claim 1, wherein the content key is encrypted, in the user equipment, with the first storage key and identification information of the user equipment, and the content key stored in the user equipment is decrypted with the first storage key and the identification information of the user equipment.

5. The method as set forth in claim 1, wherein the second storage key is generated by a decrypted key generating means provided in the user equipment.

6. The method as set forth in claim 1, wherein the user equipment deletes the second storage key depending upon whether the third storage key has been stored in the user equipment.

7. The method as set forth in claim 6, wherein, when decrypting the content key stored in the user equipment, the user equipment sends the third storage key to the key management unit; and the key management unit generates the second storage key based on the third storage key while performing an accounting following a predetermined procedure.

8. A content management method for managing content data provided to user equipment, comprising the step of:
    storing a content key encrypted with a first storage key, content data encrypted with the content key, and a second storage key in the user equipment, wherein the second storage key is generated by a storage key generating means provided in a key management unit which manages the storage keys;
    sending the encrypted content key and the second storage key to the key management unit, wherein the key management unit has stored therein the second storage key and identification information of the user equipment in which the content key encrypted with the generated second storage key is stored;
    at the key management unit, decrypting the encrypted content key using the first storage key, the first storage key being stored in the key management unit;
    encrypting the decrypted content key using the second storage key;
    sending the content key encrypted with the second storage key to the user equipment; and
    at the user equipment, decrypting the encrypted content key using the second storage key and decrypting the content data using the decrypted content key.

9. The method as set forth in claim 8, wherein upon the generation of the second storage key, the key management unit performs an accounting following a predetermined procedure.

10. The method as set forth in claim 8, wherein the key management unit encrypts the second storage key with the management key to generate a third storage key, and sends the third storage key to the user equipment; and the user equipment stores the received third storage key.

11. The method as set forth in claim 10, wherein the user equipment deletes the second storage key depending upon whether the third storage key has been stored.

12. The method as set forth in claim 11, wherein the key management unit has stored therein the identification information of the user equipment in which the content key encrypted with the second storage key is stored; the user equipment sends, when decrypting the content key stored in the user equipment, the identification information of the user equipment to the key management unit; and the key management unit generates the second storage key based on the result of comparison between identification information of the user equipment, sent from the user equipment, and the identification information of the user equipment, held in the key management unit itself, while accounting the data service following the predetermined procedure.

13. The method as set forth in claim 1, wherein the user equipment has stored therein identification information of the user equipment.

14. The method as set forth in claim 13, wherein the user equipment starts decrypting the content key stored in the user equipment depending upon the result of an inspection of the identification information of the user equipment, stored in the user equipment.

15. The method as set forth in claim 1, wherein the decrypted content key supplied from the user equipment has added thereto information that the content key has been obtained by restoration.

16. The method as set forth in claim 15, wherein when moving the content key having added thereto the information that the content key has been obtained by restoration, the user equipment performs an error process based on the result of comparison between the content key and another content key stored in a destination to which the content key is to be moved.

17. The method as set forth in claim 1, wherein the content key has added thereto frequency information that limits the number of times the content key can be used.

18. The method as set forth in claim 8, further comprising storing the content key encrypted with the second storage key in a first storage of the user equipment along with identification information of the first storage; storing the content key that is stored in the first storage, and the identification information of the first storage, into a second storage of the user equipment; and performing, when a request is made to decrypt the content key in the first storage, an error process based on the result of comparison between the identification information of the first storage and the identification information of the second storage.

19. A content management system for managing content data, comprising:
a storing means having stored therein a content key encrypted with a first storage key, content data encrypted with the content key, and a second storage key;
a sending means for sending the encrypted content key and the second storage key to a key management unit;
a first decrypting means, in the key management unit, for decrypting the encrypted content key using the first storage key, the first storage key being stored in the key management unit;
an encrypting means for encrypting the decrypted content key using the second storage key;
a second decrypting means for decrypting the encrypted content key using the second storage key and decrypting the content data using the decrypted content key; and
means for storing a public key of the key management unit;
wherein the storing means has stored therein the second storage key along with a third storage key obtained by encrypting the second storage key with the public key.

20. The system as set forth in claim 19, further comprising storage key generating means for generating the second storage key by means of a random number generator.

21. The system as set forth in claim 19, wherein the encrypting means encrypts the decrypted content key with identification information of the storing means.

22. The system as set forth in claim 19, wherein the content key is encrypted, in the storing means, with the first storage key and identification information of the storing means; and the content key stored in the storing means is decrypted with the first storage key and the identification information of the storing means.

23. The system as set forth in claim 19, wherein the storing means, first decrypting means and encrypting means form together a data storage, and wherein the key management unit manages the second storage key of the data storage.

24. The system as set forth in claim 23, wherein the data storage is a data receiver that receives a content data encrypted and sent from a data transmitter.

25. The system as set forth in claim 19, wherein the data storage deletes the second storage key depending upon whether the third storage key is stored in the storing means.

26. The system as set forth in claim 25, wherein, when decrypting the content key stored in the storing means, the data storage sends the third storage key to the key management unit; and the key management unit sends the second storage key generated based on the third storage key to a data transmitter while performing an accounting following a predetermined procedure.

27. The system as set forth in claim 23, wherein the storing means has stored therein identification information of the data storage.

28. The system as set forth in claim 27, wherein the data storage starts decrypting the content key stored in the storing means depending on the result of inspection of the identification information of the data storage, stored in the storing means.

29. The system as set forth in claim 19, wherein the storing means, first decrypting means, and encrypting means form together a data storage; and further comprising a storage key generating means, wherein the key management unit manages the second storage key of the data storage.

30. The system as set forth in claim 29, wherein the data storage is a data receiver that receives a content data encrypted and sent from a data transmitter.

31. The system as set forth in claim 29, wherein the key management unit comprises an identification information storing means in which identification Information of the storing means is stored.

32. The system as set forth in claim 29, wherein the key management unit performs an accounting following a predetermined procedure depending upon a generation of the second storage key.

33. The system as set forth in claim 29, wherein the key management unit comprises means for storing storage keys; the key management unit generates a third storage key by encrypting the second storage key with a management key and sends the third storage key to the data storage; and the data storage stores the third storage key into the storing means.

34. The system as set forth in claim 33, wherein the data storage deletes the second storage key depending upon whether the third storage key is stored in the storing means.

35. The system as set forth in claim 34, wherein the key management unit comprises means for storing the second storage key and identification information of the storing means in which the content key encrypted with the second storage key is stored; the key management unit performs an accounting when the data storage decrypts the content keys following a predetermined procedure based on the result of comparison between the identification information of the storing means, sent from the data storages and identification information stored in an identification information storing means.

36. The system as set forth in claim 29, wherein the storing means has stored therein identification information of the data storage.

37. The system as set forth in claim 36, wherein the data storage starts decrypting the content key stored in the storing means.

38. The system as set forth in claim 19, wherein the content key obtained by decryption from the storing means has added thereto information that the content key has been obtained by restoration, as requirement information.

39. The system as set forth in claim 19, wherein the content key has added thereto frequency information that limits the number of times the content key can be used.

\* \* \* \* \*